United States Patent Office 3,423,392
Patented Jan. 21, 1969

3,423,392
HETEROCYCLIC CONTAINING MONOAZO
DYESTUFFS
Hermann Wunderlich, Cologne-Mulheim, and Gerhard
Wolfrum, Opladen, Germany, assignors to Farbenfabriken Bayer Aktiengesellschaft, Leverkusen, Germany, a corporation of Germany
No Drawing. Filed July 27, 1965, Ser. No. 475,262
Claims priority, application Germany, Aug. 5, 1964,
F 43,667
U.S. Cl. 260—146            7 Claims
Int. Cl. D06p *1/10*

ABSTRACT OF THE DISCLOSURE

Novel dyestuffs useful in the dyeing of synthetic fibers are prepared and have the formula $$A-N=N-\overset{HO}{\underset{|}{B}}$$

wherein A stands for a heterocyclic residue and —B—OH stands for a member selected from the class consisting of

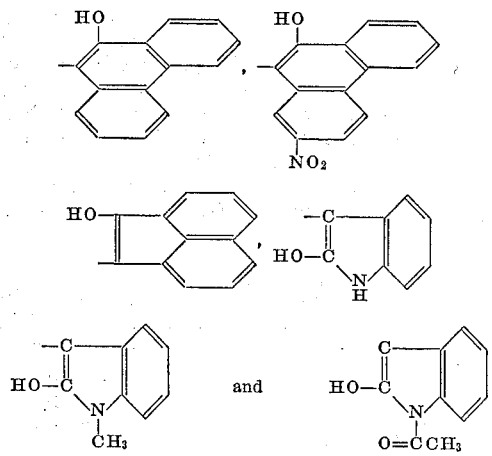

the dyestuff being free of sulphonic acid and carboxylic acid groups. The metal complex compounds of said azo dyestuffs are included.

---

The invention relates to novel azo dyestuffs; more particularly it relates to azo dyestuffs of the formula $$A-N=N-\overset{HO}{\underset{|}{B}} \qquad (I)$$

which are free from sulphonic acid and carboxylic acid groups, and to metal complex compounds of said azo dyestuffs. In the above general formula A stands for a heterocyclic radical and B represents one of the radicals

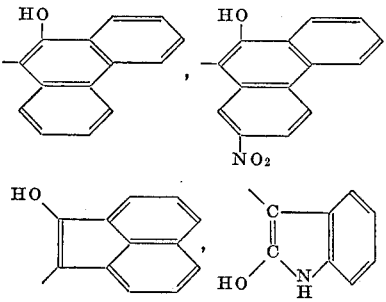

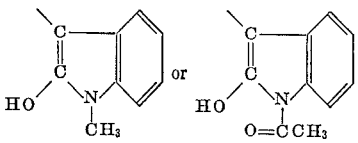

The novel azo dyestuffs are obtained when heterocyclic hydrazines of the formula

A—NH—NH₂ in which A stands for a heterocyclic radical, are reacted with 9,10-phenanthrene-quinone, 2-nitro-phenanthrenequinone, acenaphthene-quinone, isatin, dibromo-isatin, N-methyl-isatin or N-acetyl-isatin, choosing starting components which are free from sulphonic acid and carboxylic acid groups, and, if desired, the resultant azo dyestuffs are treated in substance or on or in a substrate with metal-yielding agents. The heterocyclic radical A is, in particular, a radical of the pyridine, thiazole, benzothiazole, benzimidazole, thiadiazole, quinoline, benzoxazole or triazine series. The radical A may also be further substituted, but with the exception of sulphonic acid and carboxylic acid groups.

The reaction of the starting components is preferably carried out in a weekly acidic to strongly acidic, aqueous or aqueous-organic medium at room temperature to boiling temperature. The dyestuffs obtained which are hardly soluble to insoluble in water are isolated in the usual manner.

Hydrazine compounds which are suitable for the reaction are, inter alia:
2 - hydrazino - benzimidazole, 6 - nitro - 2 - hydrazino-benzimidazole, 6 - chloro - 2 - hydrazino - benzimidazole, 6 - sulphonamido - 2 - hydrazino - benzimidazole, 6-acetylamino - 2 - hydrazino - benzimidazole, 4 - methyl-2 - hydrazino - benzimidazole, 6 - methoxy- and 6 - ethoxy - 2 - hydrazino - benzimidazole, 6 - sulphomethyl - 2-hydrazino - benzimidazole, 2 - hydrazino - pyridine, 2-hydrazino - 4,6 - bis - dimethylamino - 1,3,5 - triazine, 2-hydrazino - 4 - methyl - 6 - methoxy - 1,3,5 - triazine, 2-hydrazino - quinoline, 2 - hydrazino - benzothiazole, and its 6-sulphomethyl-, 6-sulphonamide-, 6-sulphone-dimethyl - amide-, 6 - sulphone - monomethylamide-, 6 - nitro-, 6-chloro-, 6-acetylamino-, 6-methoxy-, and 6-methyl derivatives, 2-hydrazino-4- or -5- or -7-nitrobenzothiazole, 2 - hydrazino - 5 - methoxybenzothiazole, 2 - hydrazino-5-phenyl-thiadiazole-1,3,4,2-hydrazino-benzoxazole.

The hydrazines to be used according to the invention are prepared by known methods, for example, by reacting an o-diamine with carbon disulphide, converting the resultant mercapto compound into the methylmercapto, sulpho or mercaptoacetic acid compound, and stirring the last-mentioned compound with hydrazine hydrate, or also by reduction of the corresponding diazonium salt or by exchange of a halogen atom for hydrazine.

If the new dyestuffs are to be converted into their metal complexes, metallising agents of chromium, cobalt, nickel or copper are used for this purpose, for example. The metallisation is advantageous carried out by known methods in an aqueous solution or in an organic medium, for example, formamide or ethylene glycol. To prepare the so-called 1:2 metal complexes, it is advantageous to react 2 mol. azo dyestuff with 1 mol. of the metal salt.

The dyestuffs can also be metallised on or in a substrate, for example, on or in the fibre. When metal-containing synthetic fibers, for example, nickel-containing polypropylene fibres, are dyed, the complex formation takes place on the surface and in the fibre.

The dyestuffs are eminently suitable for the dyeing and printing of synthetic fibres, especially of metal-containing polypropylene fibres or of fabrics produced therefrom. The new 1:2 metal complex dyestuffs are suitable for the dyeing and printing of synthetic materials, especially for the dyeing of polyamide fibres and of fabrics produced therefrom.

Since the dyestuffs are insoluble or hardly soluble in water, dyeing is expediently carried out in the presence of compounds acting as dispersing agents. To accelerate the dyeing, swelling agents may be added to the dyebath in the usual manner; if desired, dyeing can also be performed at elevated temperature in closed apparatus.

The following examples are given for the purpose of illustrating the invention; the parts are parts by weight, the temperatures are given in degrees centigrade.

Example 1

21 parts 9,10-phenanthrene-quinone are suspended in 250 parts dilute sulphuric acid and slowly mixed, with vigorous stirring, with a suspension of 15 parts 2-hydrazinobenzimidazole in 250 parts dilute sulphuric acid. Dyestuff formation sets in immediately. After further stirring for one hour, the reaction mixture is buffered with a dilute alkaline solution and a sodium acetate solution, the product is filtered off and washed. The precipitated dyestuff has the structure

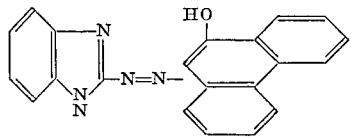

0.2 part of this dyestuff and 0.2 part of a naphthalene-sulphonic acid/formaldehyde condensation product are dispersed in 400 ml. water and the dispersion is adjusted to pH 5-6 with dilute acetic acid. 10 grams of a yarn made of nickel-modified polypropylene fibres is introduced and dyeing is carried out at boiling temperature for one hour. After a subsequent weakly alkaline after-treatment at 50° with the addition of 0.5 g./litre of a commercial detergent, a violet dyeing of very good fastness to wet processing, rubbing, solvents and light is obtained.

As nickel-modified polypropylene fibres there were used in this example those polypropylene fibres which contain nickel phenolates of bis-(alkyl-phenol)-monosulphides spun into them, besides UV-absorbers and stabilisers.

Very valuable dyeings on nickel-modified polypropylene are also obtained, when the hydrazines of the following table are used for the preparation of the dyestuff, instead of 2-hydrazino-benzimidazole:

| Hydrazine derivative | Shade on nickel-modified polypropylene material |
|---|---|
| 2-hydrazino-benzothiazole | Violet. |
| 2-hydrazino-pyridine | Yellowish red. |
| 2-hydrazino-1-methyl-benzimidazole | Red-violet-brown. |
| 1-hydrazino-4-chloro-pyridazine | Bordo. |
| 6-chloro-2-hydrazino-benzimidazole | Violet. |
| 6-nitro-2-hydrazino-benzimidazole | Reddish blue. |
| 6-ethylsulphonyl-2-hydrazino-benzimidazole | Reddish violet. |
| 6-ethylsulphonyl-2-hydrazino-1-methyl-benzimidazole | Do. |
| 2-hydrazino-pyrimidine | Red. |
| 6-methoxy-2-hydrazino-benzthiazole-1,3 | Violet. |
| 6-ethoxy-2-hydrazino-benzthiazole-1,3 | Do. |
| 6-chloro-2-hydrazino-benzthiazole-1,3 | Do. |
| 2-hydrazino-4-methyl-6-methoxy-triazine-1,3,5 | Orange. |
| 4-methyl-2-hydrazino-pyrimidine | Red. |
| 6-methyl-2-hydrazino-pyrimidine | Red. |
| 4,6-dimethyl-2-hydrazino-pyrimidine | Red. |
| 4-phenyl-2-hydrazino-pyrimidine | Red. |
| 5-phenyl-2-hydrazino-pyrimidine | Red. |
| 5-chloro-2-hydrazino-pyrimidine | Red. |
| 5-bromo-2-hydrazino-pyrimidine | Red. |
| 4-methoxy-2-hydrazino-pyrimidine | Red. |
| 5-methoxy-2-hydrazino-pyrimidine | Red. |
| 4-methoxy-6-methyl-2-hydrazino-pyrimidine | Red. |
| 5-chloro-2-hydrazino-pyrazine | Red-violet. |
| 5-hydrazino-1,2,4-triazole | Orange. |

The dyestuffs obtained according to Example 1 and the above table are also very useful for the dyeing of zinc and/or aluminum modified polypropylene fibres and for the dyeing of zinc and aluminum modified fibres which additionally contain nickel.

Example 2

35 parts 6-nitro-2-hydrazino-benzimidazole are suspended in 400 parts water and 100 parts dilute hydrochloric acid and stirred with a solution of 21 parts 9,10-phenanthrenequinone in 500 parts water and 50 parts dilute hydrochloric acid. Dyestuff formation sets in immediately. Stirring is continued for 1 hour, the pH adjusted to 5-6, the product is filtered off with suction and washed with water. The precipitated dyestuff has the constitution

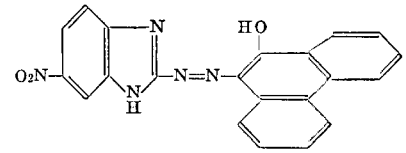

5.5 grams of the dyestuff are dissolved hot in 200 parts water and 20 parts of a 32% sodium hydroxide solution and mixed with a solution of 2 g. crystalline cobalt sulphate in 30 parts water, 20 parts of a concentrated ammonia solution and 2 parts of a 30% hydrogen peroxide solution. The mixture is stirred at 80° for 30 minutes, cooled and adjusted to pH 5-6 with acetic acid. The precipitated cobalt-containing dyestuff is filtered off with suction, washed and dried. It is a dark powder.

1 part of the dried 1:2 cobalt complex dyestuff is ground with 1 part of a naphthalene/formaldehyed condensation product, 1 part of an alkylphenyl polyglycol ether is added, and the mixture dispersed in 1000 parts water. 100 parts of a polyamide yarn are introduced into this dyebath and the temperature is slowly raised to 100°. After dyeing at this temperature for one hour, the yarn is rinsed, washed and dried. An olive shade of good general fastness properties is obtained.

Further starting components and the shades of the dyestuffs obtained therefrom after metallisation are listed in the following table.

| Hydrazine component | o-Quinone derivative | Metal | Shade of complex dyestuff on polyamide |
|---|---|---|---|
| 2-hydrazino-benzimidazole. | Isatin | Co | Reddish yellow. |
| Do | do | Cr | Do. |
| Do | N-methyl-isatin | Co | Do. |
| Do | do | Cr | Do. |
| 6-nitro-2-hydrazino-benzimidazole. | Acenaphthene-quinone. | Co | Brown. |
| Do | do | Cr | Do. |
| Do | Methyl-isatin | Co | Reddish yellow. |
| Do | do | Cr | Yellow. |

Example 3

20 parts of finely powdered phenanthrene-quinone are added at room temperature to a solution of 15.2 parts 2-hydrazino-thiazole hydrochloride [prepared according to Ber. 85, 1126 (1952)] in 200 parts of 50% methanol. 5 parts concentrated hydrochloric acid are subsequently added. Dyestuff formation sets in immediately The reaction mixture is stirred at room temperature for 2 hours and then at 40–50° for 2 hours. The reaction mixture is subsequently treated with 1000 parts water, buffered to pH 5-6 with a saturated sodium acetate solution, the product is filtered off and washed with water. The dyestuff has the structure

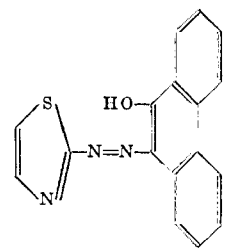

and dyes yarn made of nickel-containing polypropylene by the dyeing method described in Example 1 in red-violet shades of good fastness to wet processing, rubbing, solvents and light.

If instead of the hydrazine employed above, there is used 2-hydrazino-4-methyl-thiazole hydrochloride [prepared according to Ber. 85, 1127 (1952)] or 2-hydrazino-4,5-dimethyl-thiazole hydrochloride [prepared according to Ber 87, 1396 (1954)] and these are condensed with phenanthrene-quinone in the stated manner, then dyestuffs are obtained, which dye nickel-containing polypropylene in red-violet or violet shades of good general fastness properties.

Very valuable dyestuffs are also obtained, when the hydrazines stated in the following table are condensed with acenaphthene-quinone:

| Hydrazine | Shade on nickel-containing polypropylene |
|---|---|
| 2-hydrazino-thiazole | strongly reddish brown. |
| 2-hydrazino-4-methyl-thiazole | reddish brown. |
| 2-hydrazino-4,5-dimethyl-thiazole | brown. |

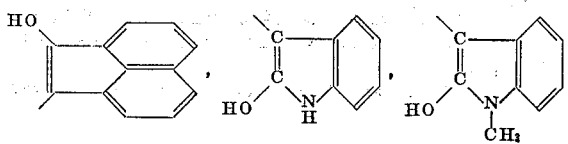

and

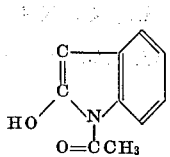

We claim:
1. A dyestuff selected from the class consisting of azo dyestuffs of the formula

$$A-N=N-B\overset{|}{\underset{}{}}\text{OH}$$

wherein A is a heterocyclic residue selected from the class consisting of the pyridine, pyrimidine, pyridazine, thiazole, benzothiazole, benzimidazole, thiadiazole, quinoline, benzoxazole and triazine radicals and substituted radicals thereof wherein the substituents are nitro, chloro, sulphonamido, acetylamino, methyl, methoxy, ethoxy sulphomethyl, sulphone or phenyl groups, —B—OH is an aromatic radical having formulas selected from the class consisting of

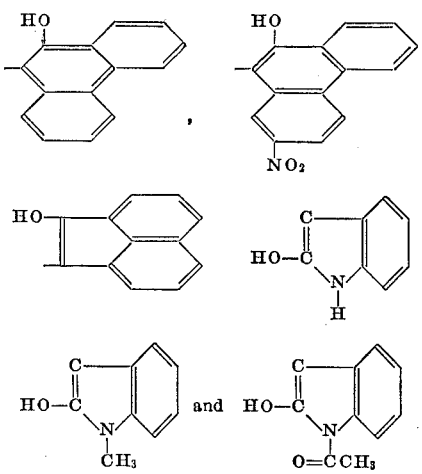

and the metal complex compounds of said azo dyestuff.

2. A dyestuff of claim 1 wherein —B—OH stands for

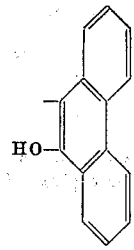

3. A dyestuff selected from the class consisting of azo dyestuffs having the formula

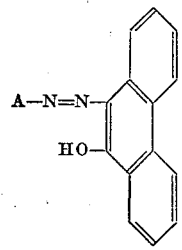

wherein A has the formula

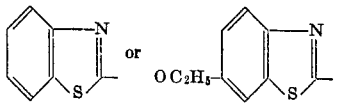

and the nickel complex compounds of said azo dyestuffs.

4. A dyestuff selected from the class consisting of azo dyestuffs having the formula

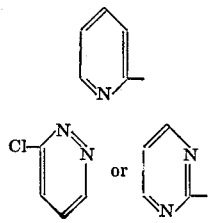

wherein A has the formula

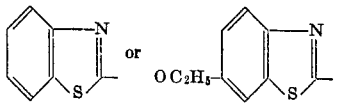

and the nickel complex compounds of said dyestuffs.

5. A dyestuff selected from the class consisting of azo dyestuffs having the formula

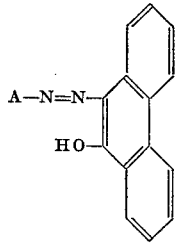

wherein A has the formula

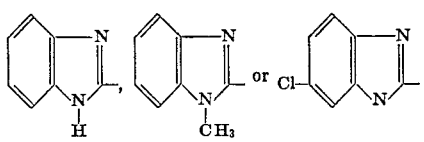

and the nickel complex compounds of said azo dyestuffs.

6. The 1:2 cobalt complex of the dyestuff of the formula

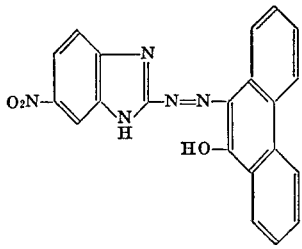

7. The 1:2 chromium complex of the dyestuff of the formula

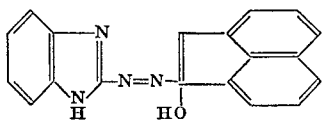

References Cited

UNITED STATES PATENTS

| | | | |
|---|---|---|---|
| 2,496,255 | 1/1950 | Von Glahn | 260—192 |
| 3,255,173 | 6/1966 | Dehnert et al. | 260—153 |
| 3,330,617 | 7/1967 | Lewis | 260—156 |

OTHER REFERENCES

Charrier, C.A.: vol. 16, pp. 2693 to 2695 (1922) QDI.A51.

Charrier et al. (I): C.A., vol. 9, pp. 792 to 794 (1915) QDI.A51.

Charrier et al. (II): C.A., vol. 31, pp. 391 to 393 (1937) QDI.A51.

Crippa, C.A.: vol. 22, p. 415 (1928) QDI.A51.

Dziewonski et al.: vol. 21, pp. 2682 to 2683 (1927) QDI.A51.

Johnson et al.: C.A., vol. 43, p. 4250 (1949) QDI.A51.

Kamel et al.: C.A., vol. 60, pp. 16015–16016 (1964) QDI.A51.

Martinet et al.: C.A., vol. 14, p. 2623 (1920) QDI.A51.

Morgan et al.: C.A., vol. 25, pp. 3988–3989 (1931) QDI.A51.

Weiss-Berg et al.: C.A., vol. 52, p. 1985 (1957) QDI.A51.

FLOYD D. HIGEL, *Primary Examiner.*

U.S. Cl. X.R.

8—41, 42, 71; 260—153, 154, 155, 156, 157, 158

UNITED STATES PATENT OFFICE
CERTIFICATE OF CORRECTION

Patent No. 3,423,392                          January 21, 1969

Hermann Wunderlich et al.

It is certified that error appears in the above identified patent and that said Letters Patent are hereby corrected as shown below:

Column 1, line 16, beginning with "Novel dyestuffs" cancel all to and including "are included." in line 47, same column 1, and insert Dyestuffs useful in the dyeing of synthetic fibers, particularly polypropylene and polyamide fibers, which dyestuffs exhibit superior fastness to wet processing, rubbing, solvents and light are prepared and have the formula

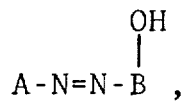

wherein A is pyridine, pyrimidine, pyridazine, thiazole, benzothiazole, benzimidazole, thiadiazole, quinoline, benzoxazole, triazine, or substituted radicals thereof wherein the substituents are nitro, chloro, sulphonamido, acetylamino, methyl, methoxy, ethoxy, sulphomethyl, sulphone or phenyl groups and -B-OH stands for a member selected from the class consisting of

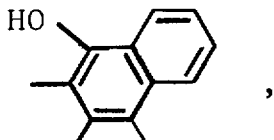 , 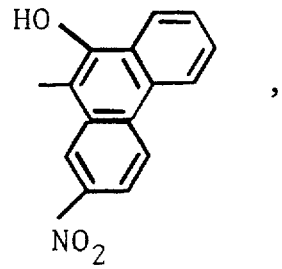 ,

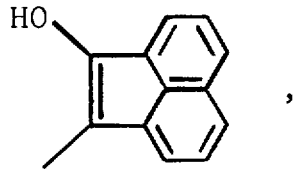 , 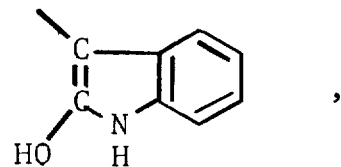 , (2)

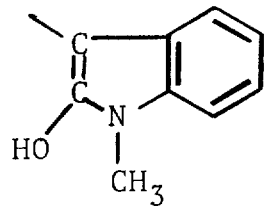 and 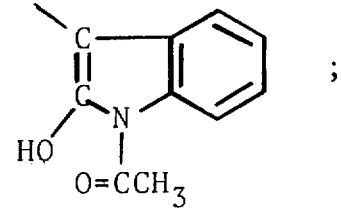 ;

the dyestuff being free of sulphonic acid and carboxylic acid groups. The metal complex compounds of said azo dyestuffs are included.

Column 2, line 25, "weekly" should read -- weakly --; line 59, "advantageous" should read -- advantageously --. Column 3, line 10, "temperature" should read -- temperatures --; lines 25 to 30, the right-hand portion of the formula should appear as shown below:

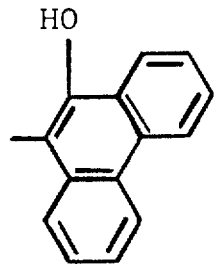

Column 5, lines 21 to 35, cancel the formulas; line 47, cancel "radicals"; line 75, after "the" insert -- nickel, cobalt or chromium --; lines 62 to 67, the right-hand formula and lines 68 to 74, both formulas, the portion, each occurrence, reading

 should read 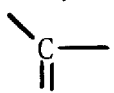

Column 6, lines 34 to 37, the left-hand formula should appear as shown below:

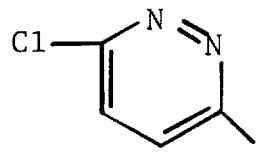

Column 7, lines 25 to 30, the formula should appear as shown below:

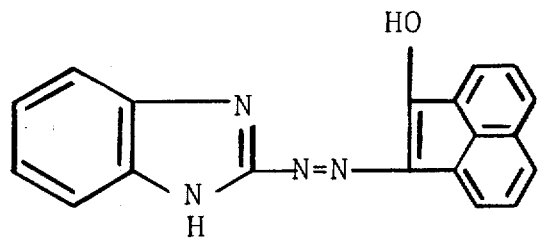

Signed and sealed this 7th day of April 1970.

(SEAL)
Attest:

EDWARD M. FLETCHER, JR.
Attesting Officer

WILLIAM E. SCHUYLER, JR.
Commissioner of Patents